June 7, 1960 J. H. FOSTER 2,940,058
MULTIPLE UNIT FEED THROUGH FILTER
Filed Feb. 20, 1958

INVENTOR.
James H. Foster
BY
Ralph Hammar
Attorney

2,940,058

MULTIPLE UNIT FEED THROUGH FILTER

James H. Foster, Erie, Pa., assignor to Erie Resistor Corporation, Erie, Pa., a corporation of Pennsylvania Filed Feb. 20, 1958, Ser. No. 716,349

3 Claims. (Cl. 333—79)

This invention is intended to provide a multiple unit feed through filter in which a large number of separate circuits can be fed through a small area of chassis wall space with the high frequency current by-passed to ground and with negligible cross talk between adjacent circuits even though the circuits are very close together. A density of twenty to forty circuits per square inch of chassis wall space can readily be realized. Throughout the range of from 50 to 1,000 megacycles the multiple unit has an improvement of 30 or more db over the ordinary tubular capacitor unit feed through.

Figure 1:
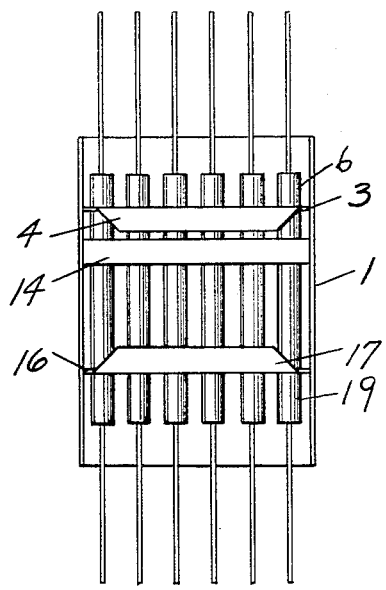
Figure 2:
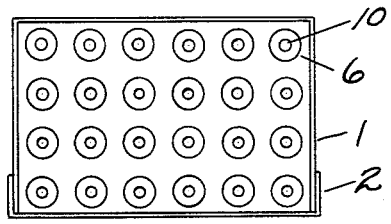
Figure 3:
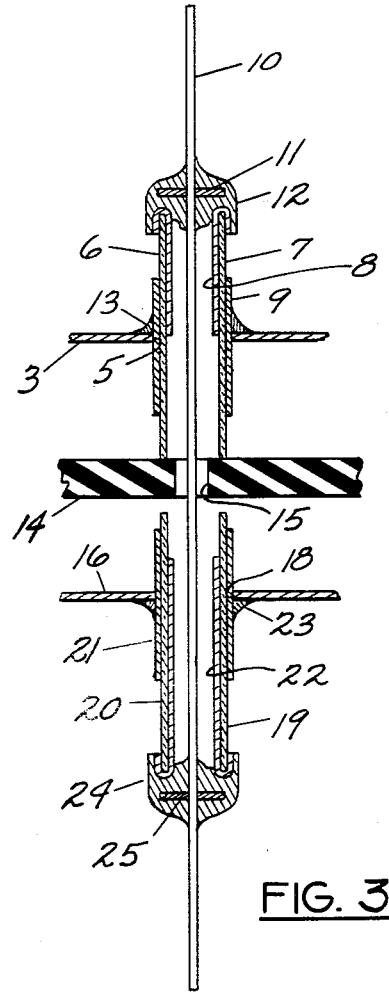
Figure 4:
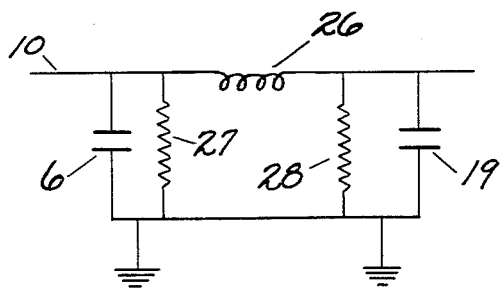

In the accompanying drawing, Fig. 1 is a side view of a multiple unit feed through filter; Fig. 2 is an end view; Fig. 3 is an enlarged view of one of the feed through elements; and Fig. 4 is a circuit diagram of one of the filter elements.

The filter is contained within an open ended metallic casing comprising a U-shaped section 1 closed by a side cover section 2. In the upper part of the casing is a metallic partition 3 having down turned flanges 4 soldered to the inside of the casing and having holes 5 receiving tubular capacitors 6. As shown more clearly in Fig. 3, each of the capacitors 6 has a tubular body 7 of ceramic with an electrode 8 metallized on its inner surface and extending out over the upper end of the ceramic body and having an electrode 9 metallized on the outer surface of the ceramic body. Each of the capacitors 6 has a feed through lead 10 having a collar 11 adjacent the upper end of the capacitor. The lead 10, collar 11 and the upper end of the inner electrode 8 are soldered together by a soldered joint 12. The outer electrodes of each of the capacitors 6 are connected to each other and to the partition 3 by soldered joints 13. A top view of the filter has the appearance of Fig. 2 with regular rows of capacitors 6 with the leads 10 projecting upwardly. After the filter is completed, a potting compound is poured into the casing so that only the projecting ends of the feed through leads 10 are visible.

Adjacent the lower ends of the capacitors 6 is a plate 14 of ferrite having clearance holes 15 for the feed through leads 10. The holes 15 are ordinarily of smaller diameter than the capacitors 6. The leads 10 extend through the holes 15 but need not be centered in the holes because it makes no difference whether or not the leads touch the ferrite. The capacitors 6 may rest on the ferrite plate 14 or may be slightly spaced from the ferrite without changing the performance of the filter.

At the lower end of the casing is a metallic partition 16 having upturned flanges 17 soldered to the inner surface of the casing. In the metallic partition 16 are a plurality of holes 18 registering with the holes 5 in the partition 3 and receiving tubular capacitors 19 which are substantially in line with the tubular capacitors 6. The capacitors 19 comprise a tubular ceramic body 20 with an outer electrode 21 and an inner electrode 22. The outer electrodes 21 of the capacitors are connected to each other and to the partition 16 by soldered joints 23. The inner electrode 22 of each capacitor is connected to the feed through lead 10 by a soldered joint 24 which makes an electrical connection to the inner electrode 22, to a collar 25 fixed to the lead 10. Because tubular capacitors act as resonant transmission lines, the capacitors 6 and the capacitors 19 are of different length so that the resonant frequencies of the capacitors do not coincide. At the resonant frequencies, there ordinarily would be a drop off in filtering efficiency. This drop in filtering efficiency is prevented to a large extent by the ferrite plate 14 which introduces an inductive effect choking the high frequency feed through and also introduces losses which flatten or attenuate the resonance peaks of the capacitor units. The losses in the ferrite are an important factor in preventing the drop in filter efficiency at the resonant frequencies of the tubular capacitor units. It is not necessary to use ferrite having low losses at high frequency. Actually the filtering efficiency is better with less expensive ferrite which has higher losses at high frequency.

Although the feed through leads 10 for the separate circuits extend through a common plate 14 of ferrite, there is negligible cross talk. This is true for all grades of ferrite. There is apparently a saturation of the ferrite due to direct current in the separate feed through leads which accounts for the filtering efficiency and the reduction of cross talk between adjacent circuits.

A lumped circuit diagram for an individual filter element is shown in Fig. 4. In this diagram the capacitors 6 and 19 are indicated as lumped capacitors connected between the feed through lead 10 and the ground and the effect of the ferrite is indicated as the inductance 26 and the shunt resistances 27 and 28.

What is claimed as new is:

1. A multiple unit feed through filter in which a large number of separate circuits can be fed through a small area with negligible cross talk between circuits even though the circuits are very close together including a ferrite plate having a plurality of side by side holes, a plurality of feed through wire extending through the respective holes and each adapted for connection in a separate circuit, a pair of tubular capacitors surrounding each wire with the capacitors of each pair on opposite sides of the ferrite plate, said capacitors having inner and outer electrodes, each wire being connected to the inner electrode of its associated capacitor, and the outer electrodes of the capacitors being connected to each other.

2. A multiple unit feed through filter in which a large number of separate circuits can be fed through a small area with negligible cross talk between circuits even though the circuits are very close together including a ferrite plate having a plurality of side by side holes, a plurality of feed through wire extending through the respective holes and each adapted for connection in a separate circuit, a ground plate on each side of the ferrite plate and having a plurality of holes therein registering with the holes in the ferrite plate, tubular capacitors received in the holes in each ground plate with the outer electrodes of the capacitors connected to each other and to the associated ground plate and with the inner electrodes of the capacitors being connected to the feed through wires.

3. The multiple unit of claim 1 in which the capacitors associated with the respective feed through wires are of different length and have different resonant frequencies.

(References on following page)

References Cited in the file of this patent

UNITED STATES PATENTS

| | | |
|---|---|---|
| 2,464,377 | Cohen et al. | Mar. 15, 1949 |
| 2,759,155 | Hackenberg | Aug. 14, 1956 |
| 2,798,207 | Reggia | July 2, 1957 |

FOREIGN PATENTS

| | | |
|---|---|---|
| 526,895 | Great Britain | Mar. 26, 1940 |

OTHER REFERENCES

Trinkaus: Sperry Engineering Review, November-December 1956, vol. 9, No. 6, pages 18–22.

Schlicke: Proceedings of the IRE May 1956, vol. 44, No. 5, pages 686–691.